United States Patent [19]

Saeki et al.

[11] Patent Number: 5,053,669
[45] Date of Patent: Oct. 1, 1991

[54] ULTRASONIC MOTOR

[75] Inventors: Takao Saeki, Farmington Hills, Mich.; Shoji Okada, Toyota, Japan; Mutsuro Aoyama; Yasuo Kuwabara, both of Nagoya, Japan

[73] Assignee: Aisin Seiki Kabushiki Kaisha, Kariya, Japan

[21] Appl. No.: 545,818

[22] Filed: Jun. 29, 1990

[30] Foreign Application Priority Data

Jun. 29, 1989 [JP] Japan .................. 1-167277

[51] Int. Cl.⁵ .......................................... H01L 41/08
[52] U.S. Cl. ................... 310/323; 310/316; 310/328; 318/116
[58] Field of Search ................. 310/323, 328, 316; 318/116

[56] References Cited

U.S. PATENT DOCUMENTS

| | | | |
|---|---|---|---|
| 4,240,141 | 12/1980 | Vasilieu et al. | 310/316 |
| 4,275,363 | 6/1981 | Mishino et al. | 310/316 |
| 4,562,374 | 5/1984 | Sashida | 310/328 |
| 4,794,294 | 12/1988 | Shimizu et al. | 310/316 |
| 4,937,488 | 6/1990 | Fujie et al. | 310/323 |
| 4,959,579 | 9/1990 | Kuwahara et al. | 310/323 |

Primary Examiner—Mark O. Budd
Assistant Examiner—Thomas M. Dougherty
Attorney, Agent, or Firm—Burns, Doane, Swecker & Mathis

[57] ABSTRACT

An ultrasonic motor is provided in which a detector will detect the amplitude of a traveling wave generated on the stator. An oscillator approximates frequency of the travelling wave with respect to the resonance frequency of the stator while the amplitude of the traveling wave is decreased. If the oscillator approaches the frequency of the traveling wave to the resonance frequency of the stator, the amplitude of the traveling wave can be maintained against increasing pressure of the increased torque load of the ultrasonic motor.

4 Claims, 5 Drawing Sheets

ULTRASONIC MOTOR

BACKGROUND OF THE INVENTION

1. Field of the Invention

This invention relates to an ultrasonic motor which rotates a rotor by developing a traveling wave on a stator.

2. Description of the Related Art

Conventionally, an ultrasonic motor which utilizes traveling waves is well known in the art. The conventional motor has a piezoelectric vibrator which is adhered to a stator. The traveling wave is generated on the stator while the piezoelectric vibrator is oscillating. The rotor rotates in response to the traveling wave. For example, the conventional ultrasonic motor is disclosed in Japanese Laid Open Patent Publication No. 58-148682 published on Sept. 3, 1983.

Referring now to FIGS. 7 and 8, a conventional ultrasonic motor is disclosed. A rotor 72 and a stator 73 are contained in the casing or housing 71.

The rotor 72 is connected to the spindle 74 which is rotatably supported in the casing 71. The rotor 72 integrally rotates with spindle 74. A pair of piezoelectric vibrators 75a, 75b are adhered to the stator 73. The piezoelectric vibrators 75a, 75b generate a traveling wave on the stator 73.

A pressure applying mechanism 76 is provided between the casing 71 and the rotor 72. The pressure applying mechanism 76 includes a rotor cam 76a and a spindle cam 76b. The rotor cam 76a is fixed to the rotor 72. The spindle cam 76b is fixed to the spindle 74. Each cam 76a, 76b has a V-shaped bottom. A plurality of steel balls 76c is pinched or secured between the V-shaped bottoms.

The steel balls 76c are positioned at the bottom of the cams 76a, 76b. However, the steel balls 76c move from the V-shaped bottom in response to an increase in load and generate an axial pressure with respect to the spindle 74. Thus, pressure between the rotor 72 and the stator 73 is applied due to the increase of load. The torque which is generated by the rotor is transmitted to the spindle 74 due to the applied pressure.

However, in the conventional ultrasonic motor, the vibration from the piezoelectric elements is confined due to the applied pressure since the pressure applying mechanism 76 generates a large pressure with respect to the increase of the load. Therefore, the conventional ultrasonic motor rapidly reduces rotational speed in response to the increase of the load.

SUMMARY OF THE INVENTION

Accordingly, one of the objects of the present invention is to obviate the above conventional drawbacks.

Another object of the present invention is to maintain the rotational speed despite an increase of the load.

To achieve the above objects and in accordance with the principles of the invention as embodied and broadly described herein, the ultrasonic motor has a rotor and a stator which includes a spring arrangement for pressing the rotor to the stator with a predetermined pressure, a modulator for increasing the pressure in response to an increase of load, and a detector for detecting intensity of a traveling wave generated on the stator. An oscillator approximates the frequency of the traveling wave to the resonance frequency of the stator while the intensity of the traveling wave is decreased.

The intensity of the traveling wave increases when the frequency of the traveling wave approaches the frequency of the stator. Therefore, if the oscillator matches the frequency of the traveling wave to the resonance frequency of the stator, the intensity of the traveling wave can be maintained against increasing pressure. Thus, the rotational speed of the rotor can be maintained.

BRIEF DESCRIPTION OF THE DRAWINGS

The accompanying drawings, which are incorporated in and constitute a part of the specification, illustrate embodiments of the invention and serve to explain the principles of the invention. Of the drawings.

DETAILED DESCRIPTION OF THE PREFERRED EMBODIMENT

Reference will now be made in detail to the present preferred embodiment of the invention, an example of which is illustrated in accompanying drawings.

Figure 1:
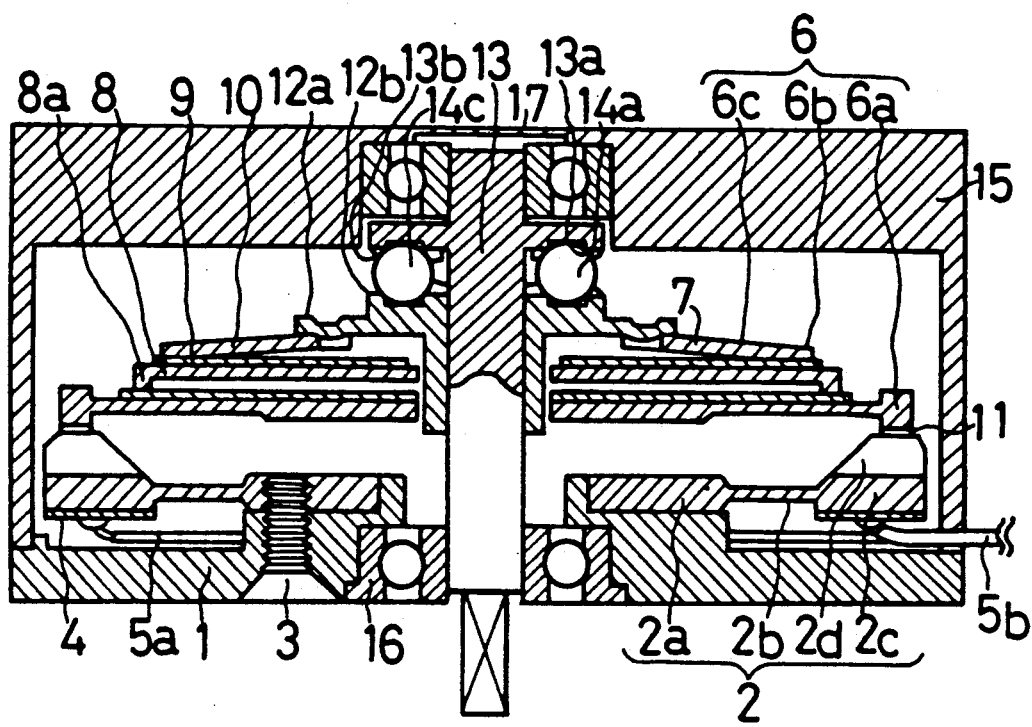
FIG. 1 is a cross-sectional view of an ultrasonic motor showing a first embodiment of the present invention.

Referring now to FIG. 1, the elements of an ultrasonic motor will be explained. A housing 15 is screwed into or otherwise connected to a base 1. A pair of bearings 16, 17 are fixed to the housing 15 and the base 1, respectively. A spindle 13 is rotatably supported by the bearings 16, 17.

An inner portion 2a of a ring shaped stator 2 is engaged with the base 1. The stator 2 is fixed rigidly to the base 1 by screws 3 so as to prevent any vibration from being generated on the inner portion 2a. A ring shaped piezoelectric vibrator 4 is adhered or otherwise secured to one side of the stator 2. The piezoelectric vibrator 4 includes a pair of vibrator elements for generating the traveling wave on the stator 2 and a detecting element for detecting amplitude of the traveling wave. Three conducting wires 5a, 5b, 5c are soldered to each of the elements of the piezoelectric vibrator 4. The wires 5a, 5b and stator 2 are used for supplying the electric power to the vibrator elements of the piezoelectric vibrator 4. The wire 5c (not shown) is used for transmitting the voltage V to the control circuit 30. The voltage V corresponds to the amplitude of the traveling wave.

The stator 2 has an inner portion 2a, a vibrating portion 2c and a connecting portion 2b integral with each other. The vibrating portion 2c has a plurality of equally pitched or spaced projections 2d along the circumference of the stator 2. The stator 2 is made from a phosphor-bronze material so as to connect the stator 2 to earth or ground. The stator 2 is electrically connected to the base 1.

The piezoelectric vibrator 4 is a well-known element which generates the traveling wave on the stator 2. The piezoelectric vibrator 4 generates the traveling wave on the stator 2 when current having a 90° phase difference is applied to the piezoelectric vibrator 4 through the conductive wires 5a, 5b.

The rotor 6 is pressed against the stator 2 at all times by the pressure of a disc spring 7. A stabilizer 8 is interposed between the rotor 6 and the disc spring 7 so as to apply the pressure of the spring uniformly around the circumference of the rotor 6. A rubber sheet element 9 is pinched between the disc spring 7 and the stabilizer 8. A further rubber sheet 10 is held between the stabilizer 8 and the rotor 6. The rubber sheets 9, 10 prevent noise generation between the disc spring 7, the stabilizer 8 and the rotor 6.

The rotor 6 has an outer portion 6a, an inner portion 6c and a connecting portion 6b integrally connected with each other. A frictional film 11 is adhered or otherwise secured to one side of the outer portion 6a of the rotor 6. The frictional film 11 is retained between the outer portion 6a of the rotor 6 and the vibrating portion 2c of the stator 2.

According to the present embodiment, the stabilizer 8 is made of steel so as to have a greater mass than the aluminum rotor 6. The steel stabilizer prevents vibrations on the rotor 6 from being transmitted to the disc spring 7. Thus, the pressure of the disc spring 7 is stabilized. Further, the stabilizer 8 is preferably a rigid body so as to reduce the absorption of the vibrations on the rotor 6.

The stabilizer 8 has a ring shaped projection 8a. The projection 8a is located radially inwardly from the contacting portion where the rotor 6 is in contact with the stator 2. The rotor 6 is pressed against the stator by the projection 8a. The projection 8a distributes the pressure uniformly along the circumference thereof since the projection 8a is of constant height.

The disc spring 7 is supported by a guard portion 12a of a holder 12. The spindle 13 is rotatably positioned in the holder 12. The holder 12 is rotatable around the spindle 13.

Figure 2:
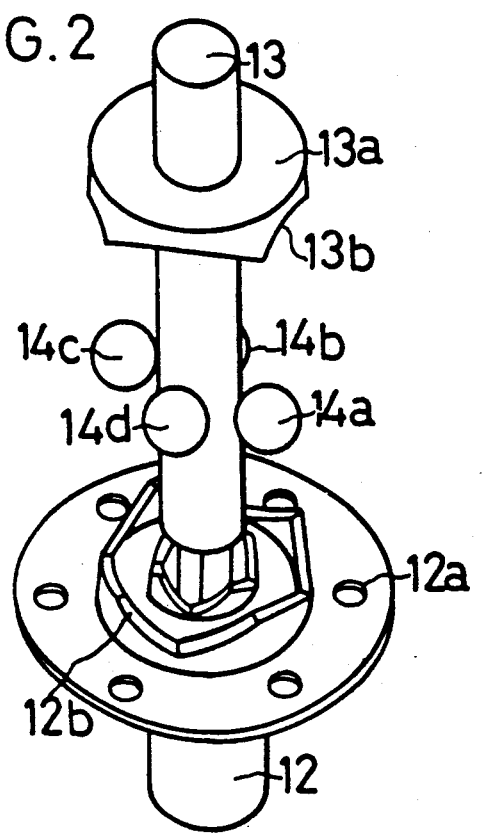
FIG. 2 is a perspective view of a pressure modulating mechanism of the first embodiment of the present invention.

FIG. 2 is an exploded perspective view showing a pressure modulating mechanism. A cam surface 12b is formed on the holder 12. The cam surface 12b has four V-shaped lobes along bottom portion thereof.

A guard portion 13a is formed integrally with the spindle 13. The guard portion 13a has a cam surface 13b corresponding to the cam surface 12b. Four steel balls 14a, 14b, 14c, 14d corresponding in number to the number of lobes are pinched or held between the cam surfaces 12b, 13b. Torque is transmitted from the rotor 6 to the holder 12 through the stabilizer 8 and the disc spring 7. Further, the torque is transmitted from the holder 12 to the spindle 13 through the steel balls 14a, 14b, 14c, 14d which are held between the cam surfaces 12b, 13b.

The pressure modulating mechanism comprises the cam surfaces 12b, 13b and the steel balls 14a, 14b, 14c, 14d and converts the torque load into an axial displacement of the holder 12.

When the torque load is small, the steel balls 14a, 14b, 14c, 14d are located on the V-shaped bottom portions of the cam surfaces 12b, 13b since angular deviation between the holder 12 and the spindle 13 is correspondingly small. At this time, the holder 12 is displaced away from the stator 2. Accordingly, the rotor 6 is pressed against the stator 2 under low pressure.

When the torque load is high, the steel balls 14a, 14b, 14c, 14d climb or otherwise move toward the top of the cam surfaces 12b, 13b, due to the large angular deviation between the holder 12 and the spindle 13. At this time, the holder 12 is displaced in the direction of the stator 2. Accordingly, the rotor 6 is pressed against the stator 2 with increased or higher pressure.

When the rotor 6 is pressed against the stator under the increased pressure, the friction force between the friction film 11 and projections 2d is increased. Thus, sliding or slippage between the rotor 6 and the stator 2 can be reduced so as to increase output torque.

When the rotor 6 is pressed to the stator 2 under increased pressure, oscillation of the stator 2 is confined by the rotor 6. As a result of this, amplitude, (i.e., energy) of the traveling wave which is generated on the stator 2 is decreased and the output torque is not satisfactorily increased. In the present invention, a control circuit 30 is available to maintain the amplitude of the traveling wave.

Figure 3:
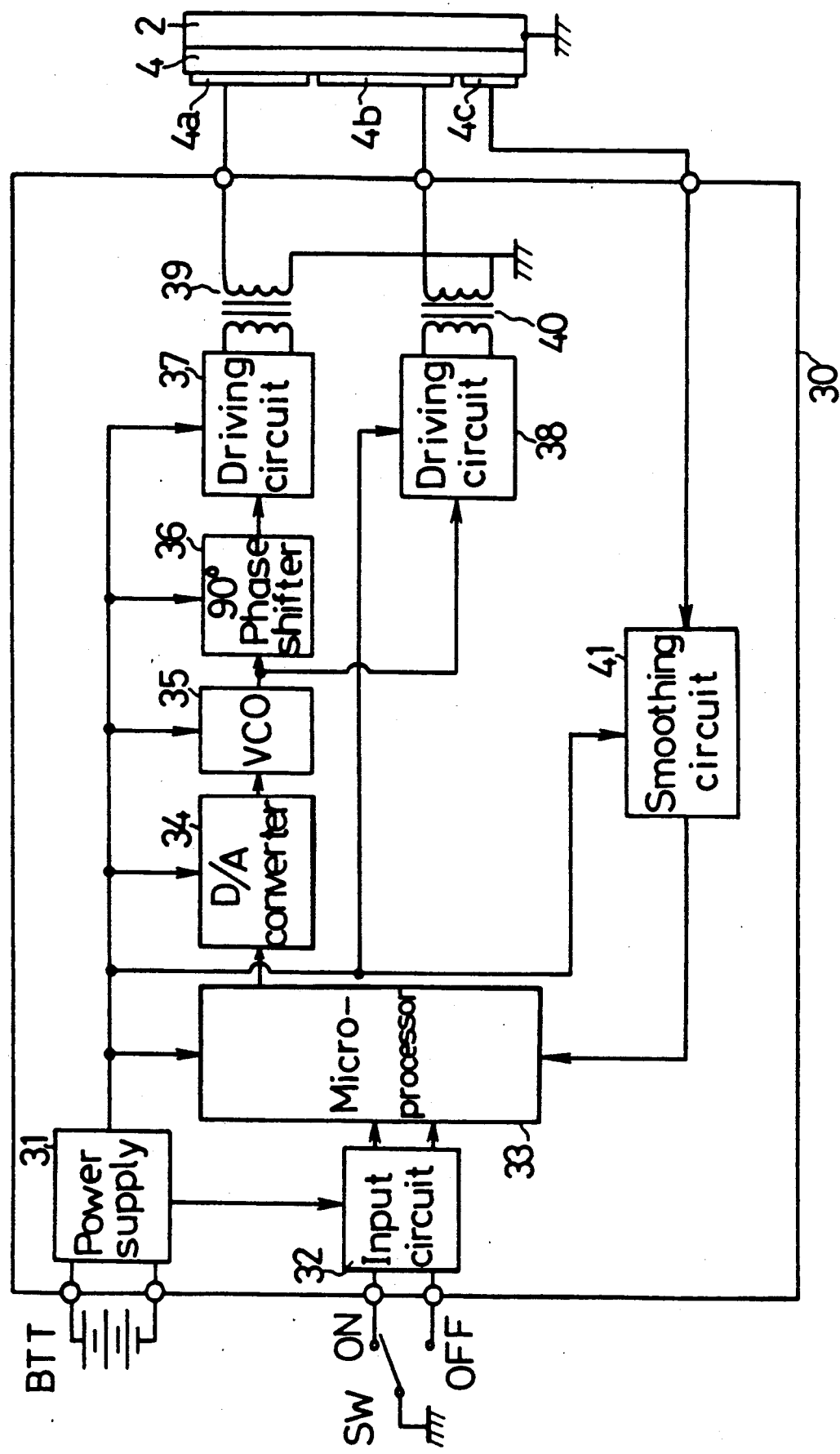
FIG. 3 is a block diagram of an electronic circuit of the first embodiment of the present invention.

FIG. 3 illustrates the control circuit 30. The control circuit 30 comprises a power supply 31, an input interface 32, a microprocessor 33, a D/A converter 34, a voltage controlled oscillator 35, a phase shifter 36, driving circuits 37, 38, boosting transformers 39, 40 and a smoothing circuit 41.

The power supply 31 is connected to a battery BTT. The power supply 31 provides regulated electric power to the control circuit 30.

The input circuit 32 is interconnected between the micro-processor 33 and a switch SW. The microprocessor 33, through the input circuit 32, is informed whether the switch SW is on or off.

The piezoelectric vibrator 4 includes a pair of electrodes 4a, 4b for generating the traveling wave on the stator 2. A pair of electrical inputs provide a current with a 90° phase difference to the electrodes 4a, 4b. The amplitude of the traveling wave on the stator 2 can be controlled by the voltage controlled oscillator 35. In more detail, the amplitude of the traveling wave can be increased by the frequency of the voltage controlled oscillator 35 approaching the resonance frequency of the stator 2. Conversely, the amplitude of the traveling wave can be decreased as the frequency of the voltage controlled oscillator 35 is moved further away from the resonance frequency of the stator 2. The resonance frequency of the stator will vary dependent on the pressure applied thereto by the rotor 6 due to the pressure of spring 7. However, if the frequency of the oscillator 35 becomes equal to the resonance frequency of the stator, the stator 2 and vibrator 4 can be damaged due to the large stresses set up by the equal frequencies. Accordingly, it is desirable for the frequency of the oscillator to approach as closely as possible to the resonance frequency of the stator but not so close as to equal or exceed the resonance frequency of the stator.

The voltage V is generated on the detecting electrode 4c by the traveling wave. The level of the voltage V is in proportion to the amplitude of the traveling wave. The voltage V generated on the detecting electrode 4c is regulated by the smoothing circuit 41. The smoothing circuit 41 receives an AC signed from the electrode 4c. The circuit 41 includes a rectifier circuit which converts the AC signal to a DC signal and a low pass filter. The micro-processor 33 reads the amplitude of the traveling wave through the smoothing circuit 41.

The micro-processor 33 controls the D/A converter 34 in response to the signal which supplied from the smoothing circuit 41. Further, the microprocessor 33 adjusts the frequency of the voltage controlled oscillator 35 so as to maintain a desired amplitude of the traveling wave.

Figure 4:
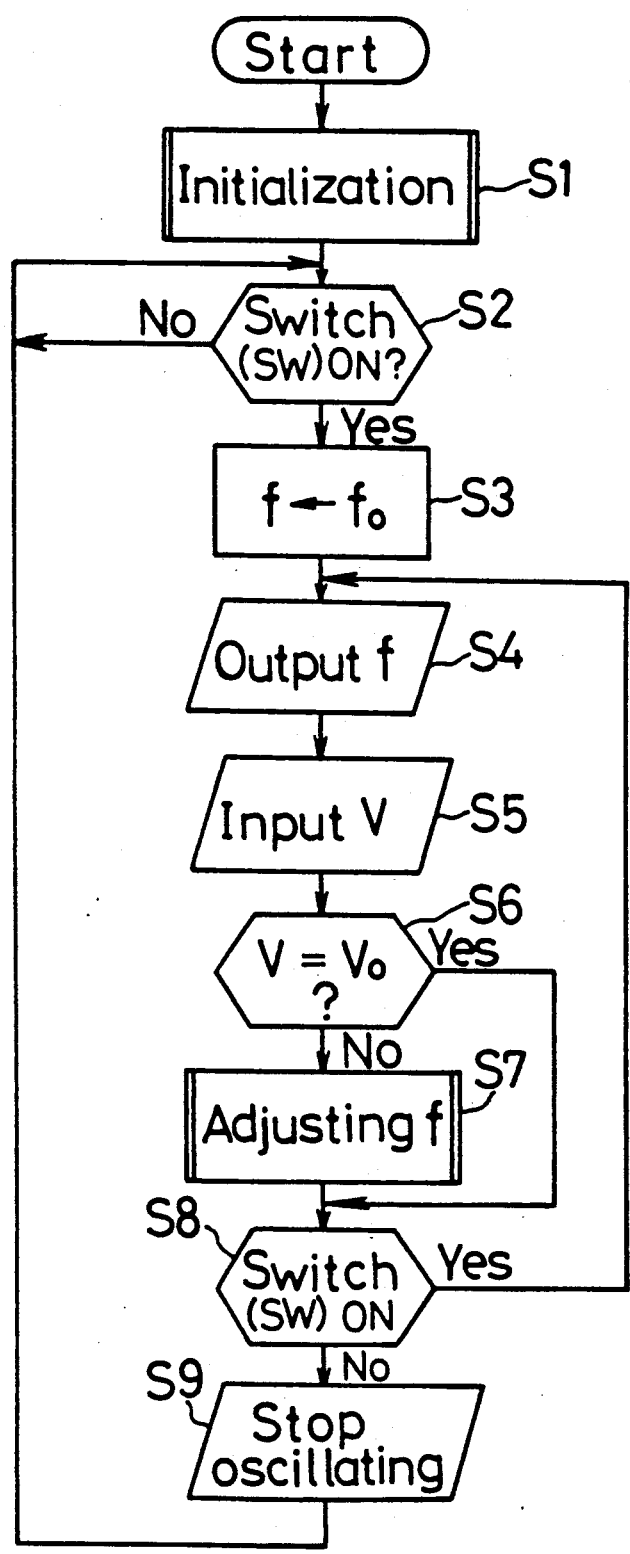
FIG. 4 is a flow chart of a program for executing the electronic circuit showing in FIG. 3.
Figure 5:
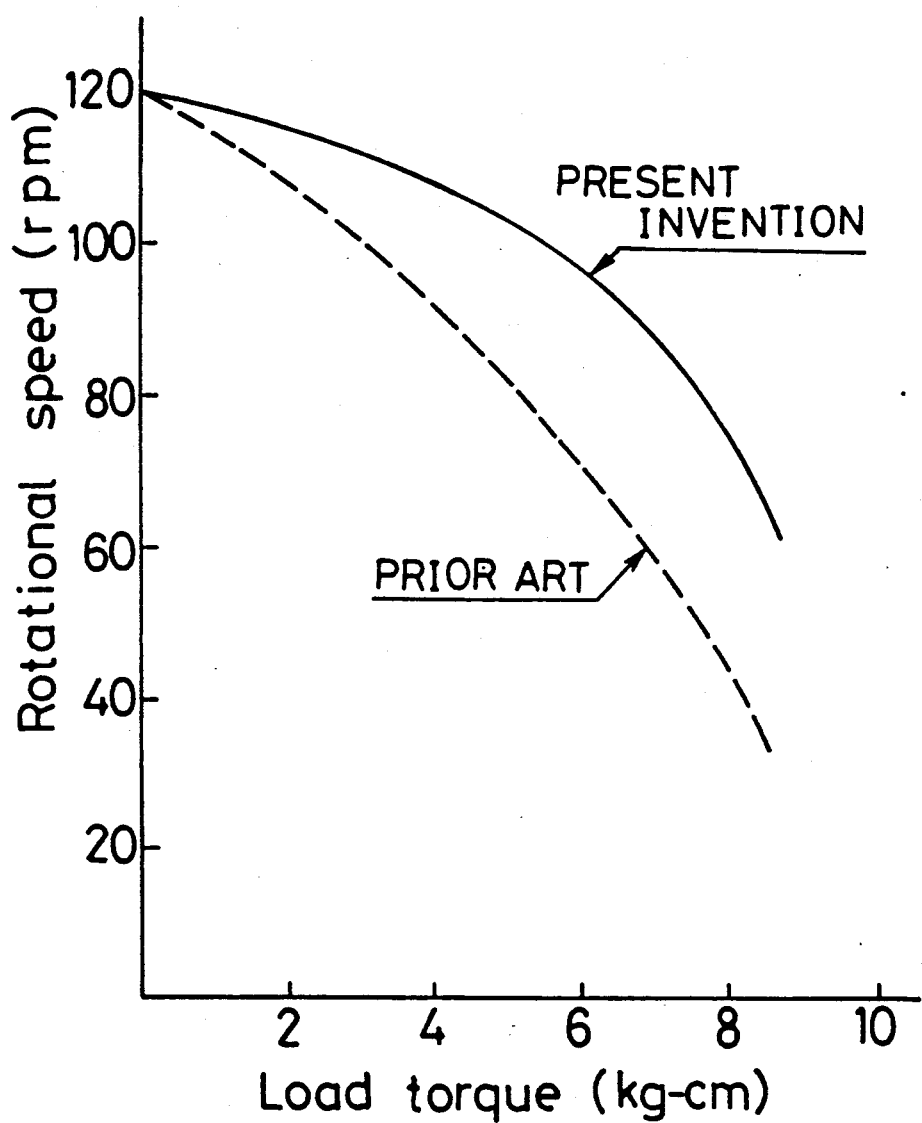
FIG. 5 is a graph showing the relationship between rotational speed and load of the first embodiment of the present invention.

FIG. 4 illustrates a program to be executed in the micro-processor 33. The micro-processor 33 starts the program when the power supply 31 is connected to the battery BTT.

In step S1, initialization is executed so as to properly process the programs.

In step S2, the micro-processor determines whether the switch SW is on or off. The step S2 is executed repeatedly until the switch SW is turned on.

In step S3, a control flag f is defined by a code corresponding to the proper driving frequency $f_o$.

In step S4, the micro-processor 33 supplies the code which is stored in the control flag f to the D/A converter 34. As soon as the control code is received by the D/A converter 34, the voltage controlled oscillator 35 oscillates at the proper driving frequency $f_o$. At this time, the rotor 6 starts rotating.

In step S5, the micro-processor 33 determines the voltage V which is generated on the detecting electrode 4c.

In step S6, the voltage V is compared with reference voltage $V_o$. If the voltage V is equal to the reference voltage $V_o$, the micro-processor 33 executes the step S8. If the voltage V is not equal to the reference voltage $V_o$ the micro-processor 33 executes step S7. As discussed, if the frequency of the voltage controlled oscillator approaches too close to the resonance frequency of the stator 2, a large amplitude may damage the vibrator 4 and stator 2. Accordingly, the output voltage from the sensor 4C is determined to be a reference voltage $V_o$ so as to be a feedback control for the vibration of the stator 2. Conventional ultrasonic motors have a constant output voltage signal from sensors of the type identified at 4C even if the torque load of the motor varies. That is, the frequency of the voltage controlled oscillator is not responsive to a change of the torque load in a conventional motor.

In step S7, the micro-processor 33 increases or decreases the code of the control flag f so as to match the voltage V with the reference voltage $V_o$.

In step S8, the micro-processor determines whether the switch SW is turned on or off. If the switch SW is on, the micro-processor 33 executes step S4 again. If the switch SW is off, step S9 is executed.

In step S9, the micro-processor 33 stops the voltage controlled oscillator from oscillating. Accordingly, the rotor 6 stops rotating.

Figure 6:
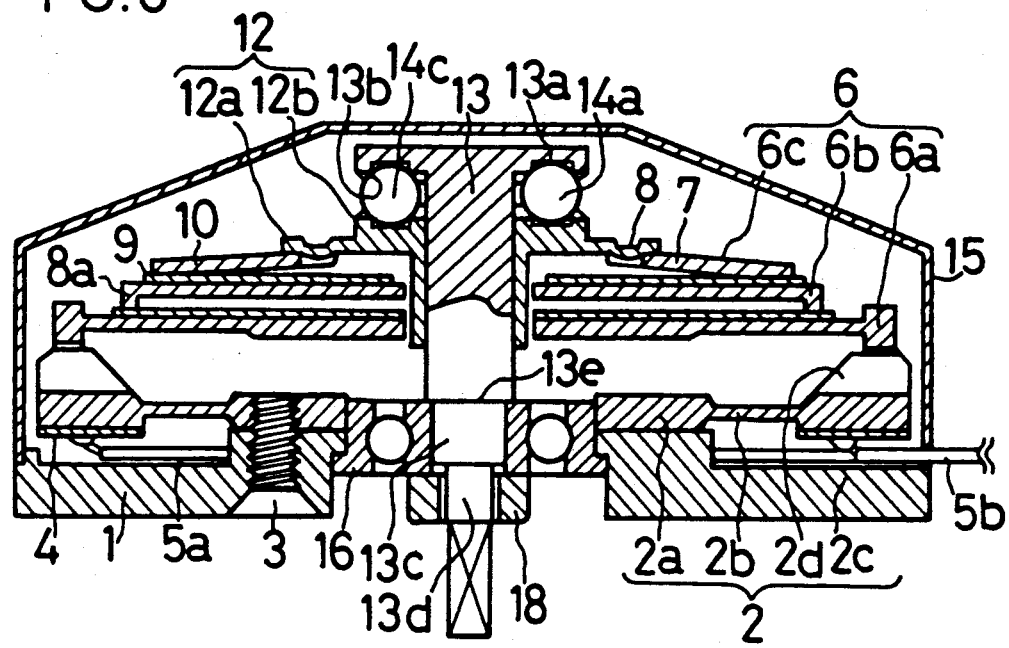
FIG. 6 is a cross-sectional view of an ultrasonic motor showing a second embodiment of the present invention.
Figure 7:
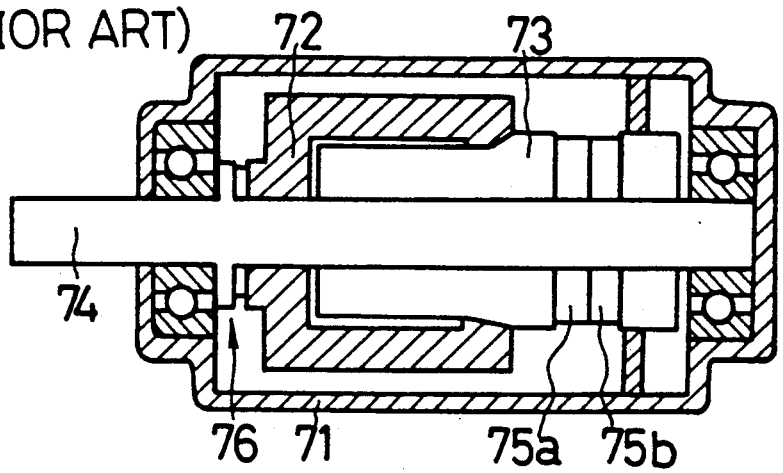
FIG. 7 is a cross-sectional view of a conventional ultrasonic motor.
Figure 8:
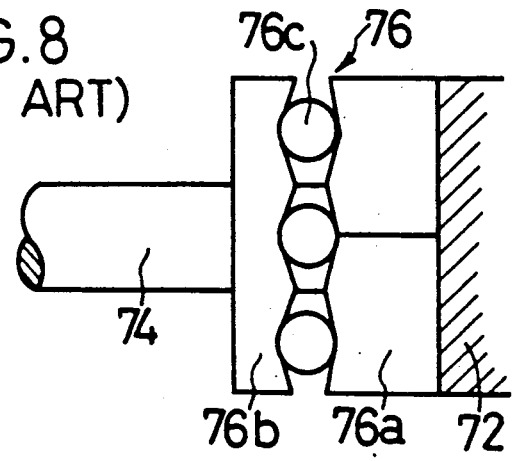
FIG. 8 is a cross-sectional view of a conventional pressure applying mechanism showing in FIG. 7.

In the first embodiment, two bearings 16, 17 are used for supporting the spindle 13. However, the spindle can be supported by single bearing arrangement 16. Referring now to FIG. 6, a second embodiment of the invention is disclosed. The following explanation will be simplified by using the same reference numerals as the first embodiment.

The spindle 13 has portions 13c, 13d inserted into the bearing 16. Screw threads are formed on the surface of the slender portion 13d and a nut 18 is thready engaged therewith. The bearing 16 is fixed to the base 1. The spindle 13 is supported by securing the bearing 16 between a portion 13e of the spindle 13 and the nut 18.

In the second embodiment, the housing does not require large structural strength, therefore, the weight of the housing 15 can be decreased by reducing the thickness.

As described above, each of the first and second embodiments of the ultrasonic motor has the following advantages.

Variation of the load torque can be detected mechanically by the pressure modulating mechanism. The pressure by which the rotor 6 is pressed to the stator 2 can be adjusted automatically by the pressure modulating mechanism so as to reduce the slipping between the rotor 6 and the stator 2, if the load torque is increased.

In addition, the variation of the torque load can be electrically detected by the detecting electrode 4c and the pressure modulating mechanism. The frequency for generating the traveling wave can be adjusted automatically by the control circuit 30 so as to increase the amplitude of the traveling wave when the load torque is increased. Therefore, output torque can be increased without the rotational speed being substantially decreased.

Thus the rotational speed can be maintained not only mechanically but also electrically against the variation of the load torque.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An ultrasonic motor having a rotor and a stator comprising:
    spring means for pressing the rotor to the stator with a predetermined pressure;
    modulating means for increasing the pressure of the rotor to the stator in response to an increase of load;
    oscillating means for generating a traveling wave on the stator,
    detecting means for detecting amplitude of the traveling wave generated on the stator; and
    wherein the oscillating means controls amplitude of the traveling wave by changing frequency with respect to resonance frequency of the stator while the amplitude of the traveling wave is changed.

2. An ultrasonic motor in accordance with claim 2, wherein said modulating means comprises a first cam surface, a second cam surface and a plurality of ball elements retained therebetween for movement between said first and second cam surfaces.

3. An ultrasonic motor in accordance with claim 2, wherein said second cam surface is driven by rotation of said rotor.

4. An ultrasonic motor in accordance with claim 2, wherein an output drive spindle is driven by said first cam surface, said ball elements transmitting torque between said first and second cam elements.

* * * * *